INVENTOR.
Howard C. Butler
By Brown, Jackson, Boettcher & Dienner
ATTORNEYS

Feb. 19, 1946. H. C. BUTLER 2,395,098
ROTARY FILTER AND FINAL SCRAPER THEREFOR
Filed Oct. 14, 1942 2 Sheets-Sheet 2

INVENTOR.
Howard C. Butler
BY Brown, Jackson, Boettcher & Dienner
ATTORNEYS

Patented Feb. 19, 1946

2,395,098

UNITED STATES PATENT OFFICE 2,395,098

ROTARY FILTER AND FINAL SCRAPER THEREFOR

Howard C. Butler, Port Huron, Mich., assignor to Morton Salt Company, Chicago, Ill., a corporation of Illinois Application October 14, 1942, Serial No. 461,953

3 Claims. (Cl. 210—201)

This invention relates to rotary filters and has to do with such a filter and a final scraper therefor.

It is known, in the making of salt, to use rotary filters for removing the brine from the salt, by discharging a mixture of brine and salt, or slurry, onto a rotating foraminous drum subjected to suction interiorly for drawing the brine out of the salt and forming a salt cake on the exterior of the drum. The salt cake is removed from the drum by scrapers, including a scraper at the front of the spray chamber, known as the final scraper. The final scraper commonly used at present is in the form of a blade or knife mounted on a support and directed oppositely or contra to the direction of rotation of the drum. The edge of the knife is placed an appreciable distance, from about 1/8 to about 1/4 of an inch, from the screen on the drum, to guard against catching of the screen on the knife with resultant injury to and jamming of the drum. This spacing of the knife, combined with the suction within the drum, results in an objectionable amount of the salt cake remaining on the drum and traveling therewith beyond the knife into the spray chamber. Also, salt particles resulting from removal of the outer portion of the salt cake by the knife are drawn in considerable quantity into the spray chamber, by the effect of the suction within the drum. That results in clogging or screen blinding of the drum, necessitating removal of the excessive salt, usually by dissolving it with water. The necessity for removing this excess salt from the drum slows down the operation of the filter and also results in a considerable loss of salt, which is objectionable for obvious reasons.

My invention is directed primarily to avoiding the above noted objections to the present type of rotary filter and final scraper. To that end, I provide a final scraper of a character to assure substantially complete removal of the salt cake from the drum. More specifically, I provide means for projecting an air blast across the edge of the scraper knife in a direction generally toward the drum and contra to the direction of rotation thereof, this air blast serving to neutralize the suction within the drum and being projected between the latter and the salt cake assuring, in conjunction with the scraper knife, complete removal of the cake, while also effectively preventing salt particles from being drawn into the spray chamber. In one specific form of my invention, illustrated herein by way of example, the means for projecting the air blast across the edge of the knife comprises a plate mounted upon the back of the knife and defining therewith an air receiving compartment having a restricted discharge slot extending substantially the full length of the knife and disposed to project the air blast downwardly and forwardly across the edge of the knife, as and for the reasons above stated. The plate is so formed as to assure uniform distribution of the air blast throughout the length of the discharge slot, in a manner to assure complete removal of the salt cake throughout the full length of the drum. Further objects and advantages of my invention will appear from the detail description.

In the drawings—

Figure 1:
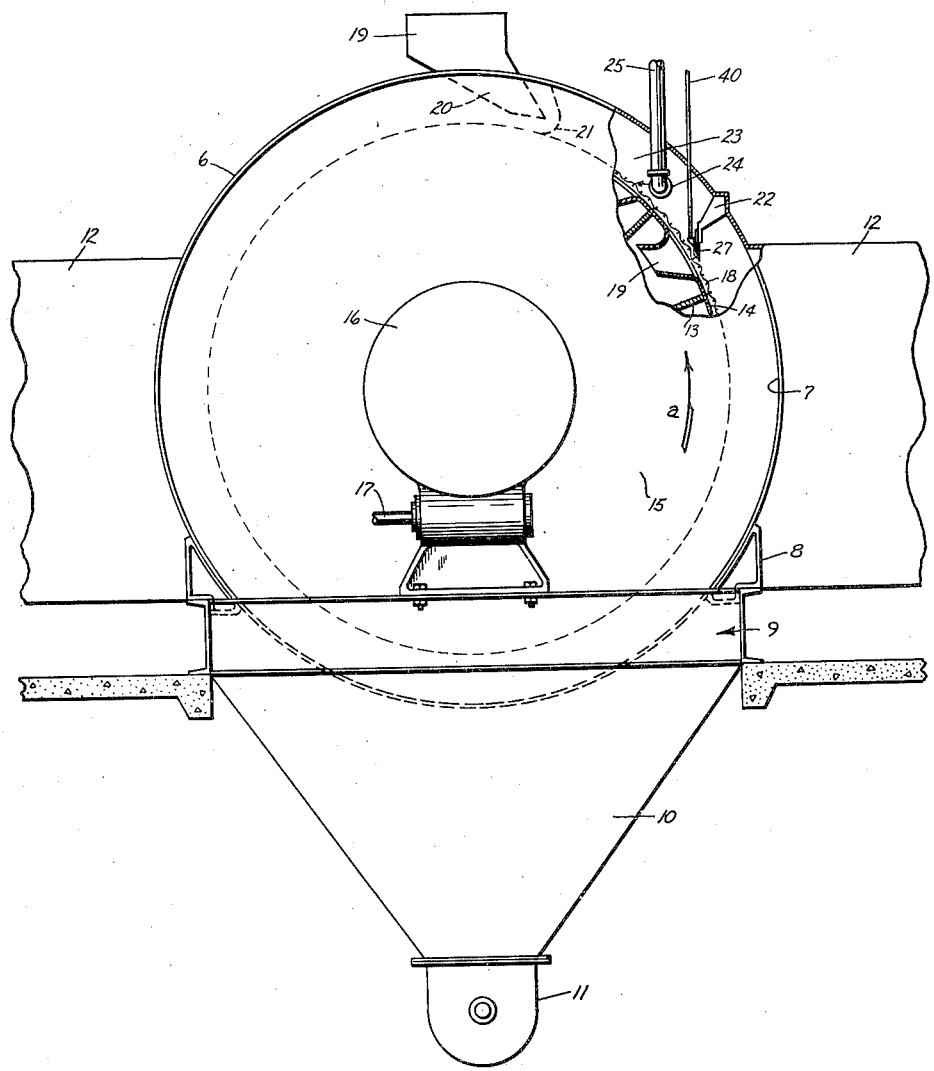
Figure 1 is a more or less diagrammatic side view of a rotary filter of known type having applied thereto a final scraper embodying my invention, partly broken away and in section.

The final scraper of my invention may be applied to any suitable known rotary filter. I have shown it, by way of illustration, as applied to a rotary filter like that disclosed in Patent No. 2,067,415, issued January 12, 1937, to Clinton S. Robison. This rotary filter is of known construction and a brief description thereof will suffice. It comprises a casing 6 having at each side a ring 7 mounted by suitable brackets 8 on a supporting framework 9, from which depends a downwardly converging hopper 10 opening into a trough 11 within which is disposed a screw conveyor (not shown). This screw conveyor serves to deliver the salt cake removed from the drum of the filter to other suitable means for conveying it to known apparatus for further treatment. Hot air ducts 12 open into casing 6 at the front and back thereof, for supplying thereto heated air which is drawn through the drum screen and through the salt cake formed thereon, for drying the salt.

The drum is suitably mounted for rotation within casing 6 and comprises a hollow tubular hub (not shown) tapering toward one end of the drum, from which hub radiate vanes or fins 13.

Openwork grid sections 14 are suitably mounted at the outer ends of the vanes 13 and extend between annular heads, one of which is shown at 15, at the ends of the drum. The latter is rotated by suitable gearing, usually worm gearing, enclosed within a gear housing 16 and driven by a shaft 17, such gearing having appropriate driving connection to the drum for continuously rotating the latter in the direction indicated by the arrow $a$ in Figure 1. The grid sections 14 have a reticulated screen 18 of appropriate mesh mounted thereon and extending about the drum, between the end plates or heads thereof, at the outer faces of grids 14. The latter are provided with inwardly projecting elements 19 forming pockets effective for retaining water which may run down the vanes 13 in the rotation of the drum, so as to return this water to the hub of the drum and prevent it entering the salt cake formed on the exterior of the drum.

A suitable mixture of salt and brine, in the form of a slurry, is delivered onto the drum screen 18 at the upper portion of the drum, throughout the full extent of this screen lengthwise of the drum, by means of a feed box 19 and a trough 20 extending downward therefrom and terminating adjacent and in rear of a feed dam 21 suitably supported by the side rings 7 of frame 6. A knife holder or scraper support 22, of suitable known construction, is secured in a suitable known manner, conveniently by bolting, to the side rings 7 and extends therebetween lengthwise of the drum, a short distance in advance of feed dam 21, with respect to the direction of rotation of the drum, the space within casing 6 between feed dam 21 and support 22 constituting a compartment 23 commonly termed the spray chamber. A spray head 24 is disposed within chamber 23 and is provided with suitably arranged openings for projecting a brine spray against the drum as it travels through compartment 23, for washing from the drum any salt particles remaining thereon, so as to leave the screen 18 and the grid sections 14 clean and unobstructed for reception of the slurry delivered onto the screen as it passes beneath the trough 20. Brine under suitable pressure is supplied to head 24 by means of a pipe 25.

The rotary filter as described so far is of known construction and operation, preferably similar to that disclosed in the above identified patent, and the details of construction of the filter drum and of the means supporting and rotating it and associated parts are not essential features of my invention and, accordingly, have not been illustrated. It will be understood that my invention may be applied to any suitable known rotary type of filter.

Figure 2:
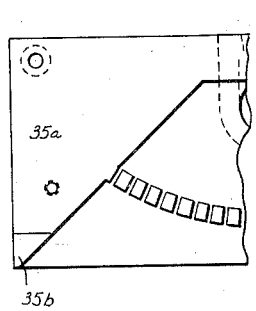
Figure 2 is a front view, on an enlarged scale, of the blower plate, partly broken away.
Figure 2:
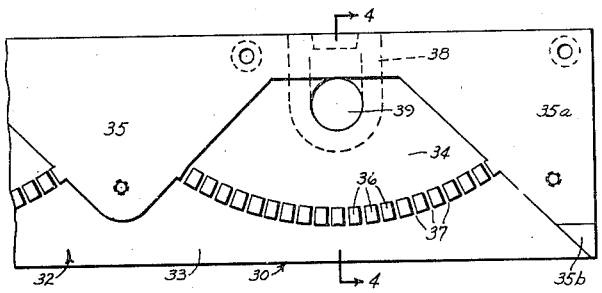
Figure 3:
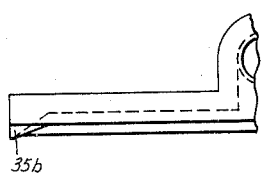
Figure 3 is a plan view of the blower plate of Figure 2, partly broken away.
Figure 3:
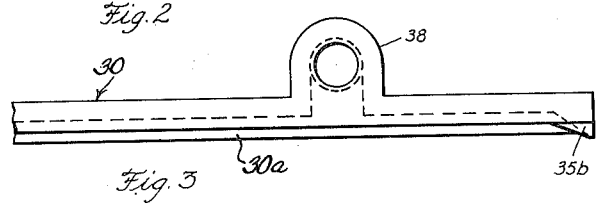

A scraper blade or knife 27, of generally oblong shape, is secured to support 22, conveniently by bolting, and extends downward therefrom toward the drum of the filter generally in a direction opposite or contra to the direction of rotation of the drum. The lower portion of knife 27 is beveled downwardly and forwardly to provide a flat surface 28, inclined downwardly of the drum contra to the direction of rotation thereof and extending to the cutting edge 29 of knife 27. A blower plate 30 of elongated rectangular shape in front view, as shown more clearly in Figure 2, is secured on the back of knife 27 in a suitable known manner, conveniently by means of appropriately located and spaced screws 31. Plate 30 is provided in its front face with a recess defining a compartment 32 comprising a lower discharge chamber 33 and a plurality of upper inlet chambers 34 of substantially inverted V-shape, disposed between substantially V-shaped elements 35 of plate 30 extending forwardly beyond the rear walls of chambers 34. Plate 30 is further provided, at the lower end of each inlet chamber 34, with an arcuate series of elements 36 projecting forwardly therefrom, with their forward faces in the plane of the elements 35, the elements 36 being spaced apart and defining therebetween slots 37, opening generally radially from inlet chamber 34 into the lower outlet or discharge chamber 33. A boss 38, formed integrally with plate 30 at the upper portion of the back thereof, is suitably bored to provide an inlet passage 39 opening into inlet chamber 34, at the center of the upper portion thereof, there being a boss 38 associated with each of the inlet chambers 34. At the upper end of passage 39, each boss 38 is suitably bored and tapped for reception of the lower end of an air supply pipe 40 screwing into boss 38. Air or other suitable fluid under pressure is supplied to pipes 40 from any suitable known source of supply, for a purpose which will appear presently.

Plate 30 is provided, at each end of its forward face, with a substantially triangular pad or projection 35a having at its lower end an element 35b inclined downwardly and forwardly relative to projection 35a. The latter projections and the elements or projections 35 have their forward faces accurately ground so as to be disposed in a common plane and seat accurately against the rearward flat face of knife 27, when plate 30 is mounted thereon. The lower outlet or discharge chamber 33 of compartment 32 decreases downward in depth and, when plate 30 is mounted upon knife 27 in cooperating relation thereto, elements 35b seat against surface 28 of the knife and the lower portion of chamber 33 defines with surface 28 a restricted discharge slot 42 extending substantially the full length of knife 27 and closed at its ends by elements 35b, this slot being parallel with surface 28. Preferably, the lower portion 30a of plate 30 is disposed at a downward and forward inclination to the body of this plate so as to extend substantially parallel with surface 28 of knife 27, though that is not essential to my invention. It is preferred, however, as avoiding any objectionable obstruction of the space between the rearward portion of the knife and the filter drum, which may be important in certain cases.

Figure 5:
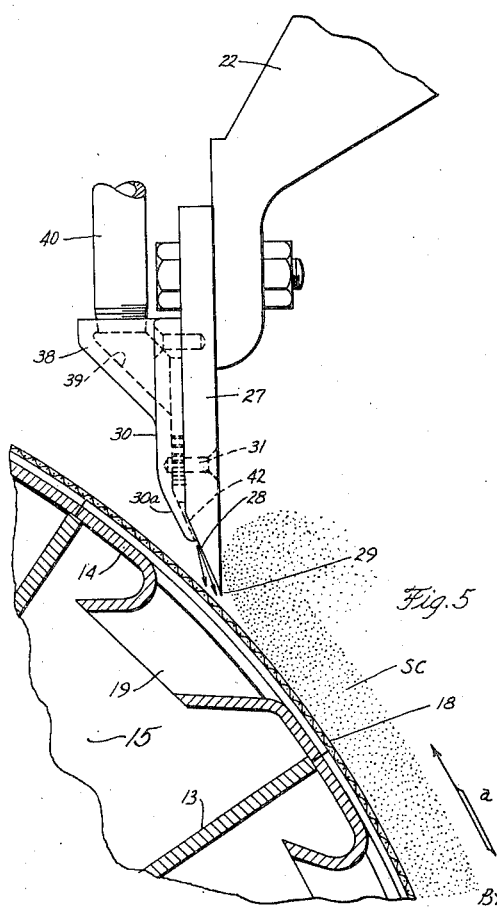
Figure 5 is a side view of the knife support and the knife and the blower plate mounted thereon, certain parts being broken away, showing the filter drum fragmentarily and in section and the manner in which the final scraper removes the salt cake from the drum.
Figure 4:
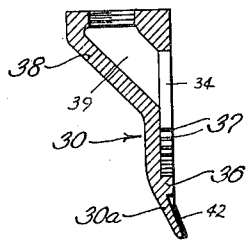
Figure 4 is sectional view taken substantially on line 4—4 of Figure 2.

When the filter is in operation, air or other suitable fluid under pressure is supplied through pipes 40 to compartment 32 defined by plate 30 and the rear face of knife 27. This air is projected in the form of a high velocity blast downward and forward along surface 28 of knife 27 and across edge 29 thereof, in a direction generally downward toward the drum and contra to the direction of rotation thereof, as indicated by the arrows in Figure 5, in which figure the direction of rotation of the drum is indicated by the arrow $a$. As the drum rotates the salt cake $sc$ formed thereon engages the edge 29 of knife 27, which urges the salt cake away from screen 18 of the drum. In addition, the blast of air is projected across edge 29 of the knife 27 in a direction toward the salt cake and passes between the latter and screen 18, this blast neutralizing the effect of the suction within the drum and passing beneath the salt cake, thus exerting pressure on the inner face thereof and urging the salt cake outward away from the drum. By the combined action of the knife 27 and the air blast projected across the edge thereof in the manner described, the salt cake sc is quickly and cleanly stripped for its full thickness from the drum screen 18. Any salt particles liberated from the salt cake during this stripping operation, due to breakage or cracking thereof, will be driven by the air blast downwardly and forwardly of the drum in a direction away from the spray chamber 23, thus obviating the possibility of salt particles entering this chamber to an objectionable extent, if at all. I have found that a final scraper embodying the knife and means for projecting an air blast downwardly across the edge of the knife and contra to the direction of rotation of the drum, effectively prevents entry of salt, either in cake form or in particle form, into the spray chamber 23 in objectionable amount. That effectively eliminates the above referred to objections to rotary filters provided with final scrapers of present type, above referred to, and renders possible materially increased production over such filters, which is an important consideration in the salt industry.

While I have shown my invention as embodied in one specific form thereof, by way of example, it will be understood that changes in construction and arrangement of parts of my invention may be resorted to without departing from the field and scope thereof, and I intend to include all such variations, as fall within the scope of the appended claims, in this application in which the preferred form only of my invention is disclosed.

I claim:

1. In combination with a rotary type of filter having a rotating foraminous drum with a spray chamber at the upper portion of said drum and means for delivering onto the latter in back of said spray chamber a mixture of salt and brine to be filtered, a final scraper at the front of said chamber comprising a knife supported with its edge adjacent said drum and directed contra to the direction of rotation of the latter, a plate seating on the back of said knife having its forward face recessed providing a compartment comprising a lower discharge chamber and upper receiving chambers adjacent said lower chamber, said plate being provided at the bottom of each receiving chamber with a series of spaced elements arranged in an arc thereacross and extending forward to said knife and defining between them slots extending generally radially of said arc and opening into said discharge chamber, the lower portion of said plate being spaced from said knife defining therewith a discharge slot, said compartment being otherwise substantially closed against discharge of air therefrom, and means for supplying air under pressure to the respective receiving chambers substantially centrally thereof.

2. In combination with a rotary type of filter having a rotating foraminous drum with a spray chamber at the upper portion of said drum and means for delivering onto the latter in back of said spray chamber a mixture of salt and brine to be filtered, a final scraper at the front of said chamber comprising a knife supported with its edge adjacent said drum and directed contra to the direction of rotation of the latter, a plate seating on the back of said knife having its forward face recessed providing a compartment comprising a lower discharge chamber and upper receiving chambers of substantially inverted V-shape adjacent said lower chamber, said plate being provided at the bottom of each receiving chamber with a series of spaced elements arranged in an arc thereacross and extending forward to said knife and defining between them slots extending generally radially of said arc and opening into said discharge chamber, the lower portion of said plate being spaced from said knife defining therewith a discharge slot, said compartment being otherwise substantially closed against discharge of air therefrom, and means for supplying air under pressure to the respective receiving chambers substantially centrally thereof.

3. In combination with a rotary type of filter having a rotating foraminous drum with a spray chamber at the upper portion of said drum and means for delivering onto the latter in back of said spray chamber a mixture of salt and brine to be filtered, a final scraper at the front of said chamber comprising a knife supported with its edge adjacent said drum and directed contra to the direction of rotation of the latter, said knife being provided at its lower portion with a surface extending downwardly and forwardly substantially to the edge of said knife, a plate seating on the back of said knife with its lower portion extending along said surface in spaced relation thereto and seating at its ends on said surface, said plate having its forward face recessed providing a compartment comprising a lower discharge chamber and upper receiving chambers of substantially inverted V-shape adjacent said lower chamber, said plate being provided at the bottom of each receiving chamber with a series of spaced elements arranged in an arc thereacross and extending forward to said knife and defining between them slots extending generally radially of said arc and opening into said discharge chamber, said lower portion of said plate defining with said surface a restricted discharge slot opening from said lower chamber extending substantially the full length of said knife and closed at its ends, said compartment being otherwise substantially closed against discharge of air therefrom, and means for supplying air under pressure to the respective receiving chambers substantially centrally thereof.

HOWARD C. BUTLER.